United States Patent
Morton et al.

(10) Patent No.: US 10,344,607 B2
(45) Date of Patent: Jul. 9, 2019

(54) INTERNALLY COOLED ENGINE COMPONENTS

(71) Applicant: United Technologies Corporation, Farmington, CT (US)

(72) Inventors: Jeffrey T. Morton, Manchester, CT (US); San Quach, Southington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 287 days.

(21) Appl. No.: 15/416,900

(22) Filed: Jan. 26, 2017

(65) Prior Publication Data

US 2018/0209287 A1 Jul. 26, 2018

(51) Int. Cl.
*F01D 9/06* (2006.01)
*F01D 5/18* (2006.01)

(52) U.S. Cl.
CPC ............. *F01D 9/065* (2013.01); *F01D 5/187* (2013.01); *F05D 2250/185* (2013.01); *F05D 2250/323* (2013.01); *F05D 2250/324* (2013.01); *F05D 2260/204* (2013.01); *F05D 2260/22141* (2013.01); *Y02T 50/676* (2013.01)

(58) Field of Classification Search
CPC . F01D 9/065; F01D 5/187; F01D 9/06; F01D 5/18; F05D 2250/185; F05D 2250/323; F05D 2250/324; F05D 2260/204; F05D 2260/22141; F05D 2260/2214; Y02T 50/676
USPC ................................................. 415/116, 177
See application file for complete search history.

(56) References Cited

U.S. PATENT DOCUMENTS

| | | | |
|---|---|---|---|
| 5,738,493 A * | 4/1998 | Lee | F01D 5/187 416/97 R |
| 8,303,253 B1 | 11/2012 | Liang | |
| 2010/0104432 A1* | 4/2010 | Hasselqvist | F01D 5/143 415/191 |
| 2011/0123311 A1 | 5/2011 | Devore et al. | |
| 2014/0093361 A1* | 4/2014 | Riley | F01D 25/12 415/178 |

(Continued)

FOREIGN PATENT DOCUMENTS

| WO | 2014052277 | 4/2014 |
|---|---|---|
| WO | 2015109040 | 7/2015 |

OTHER PUBLICATIONS

European Patent Office, European Search Report dated Aug. 20, 2018 in Application No. 18152614.6-1006.

*Primary Examiner* — Nathaniel E Wiehe
*Assistant Examiner* — Emily S Adelman
(74) *Attorney, Agent, or Firm* — Snell & Wilmer, L.L.P.

(57) ABSTRACT

A component of a gas turbine engine is provided. The component may include an external surface with a skin cavity adjacent the external surface. The skin cavity may be defined by a hot-side surface and a cool-side surface with the hot-side surface between the cool-side surface and the external surface. A flat portion may be disposed on the hot-side surface and may, for example, define a wall-thickness check region. A protrusion may be disposed on the cool-side surface opposite the flat portion on the hot-side surface. The hot-side surface and the cool-side surface may tend to increase a heat transfer coefficient along the flat portion of the hot-side surface, which may also define a wall thickness check region.

20 Claims, 7 Drawing Sheets

(56) References Cited

U.S. PATENT DOCUMENTS

| | | | |
|---|---|---|---|
| 2015/0044029 A1* | 2/2015 | Tibbott | F01D 5/18 415/115 |
| 2016/0186660 A1* | 6/2016 | Bergholz | F02C 7/18 416/95 |
| 2016/0237849 A1* | 8/2016 | King | F01D 5/187 |

* cited by examiner

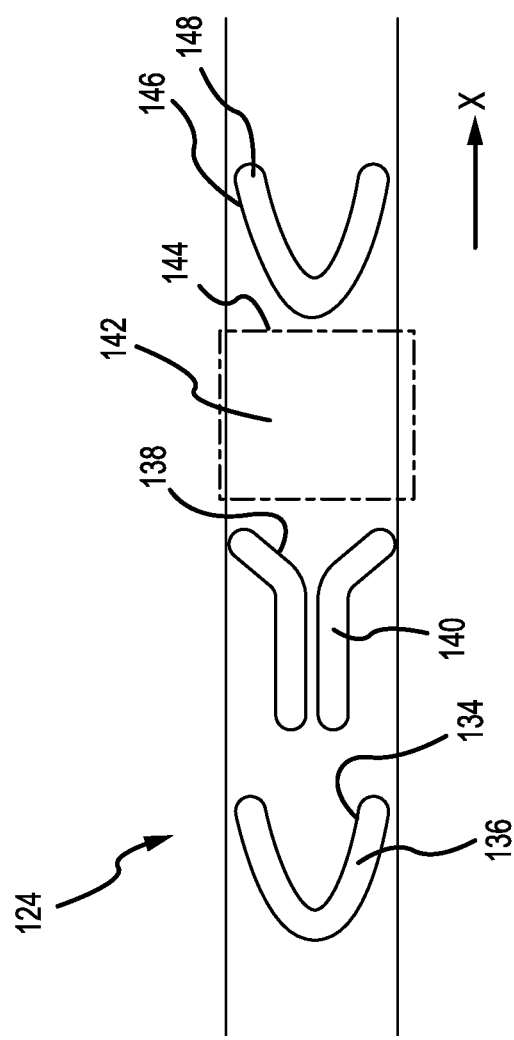

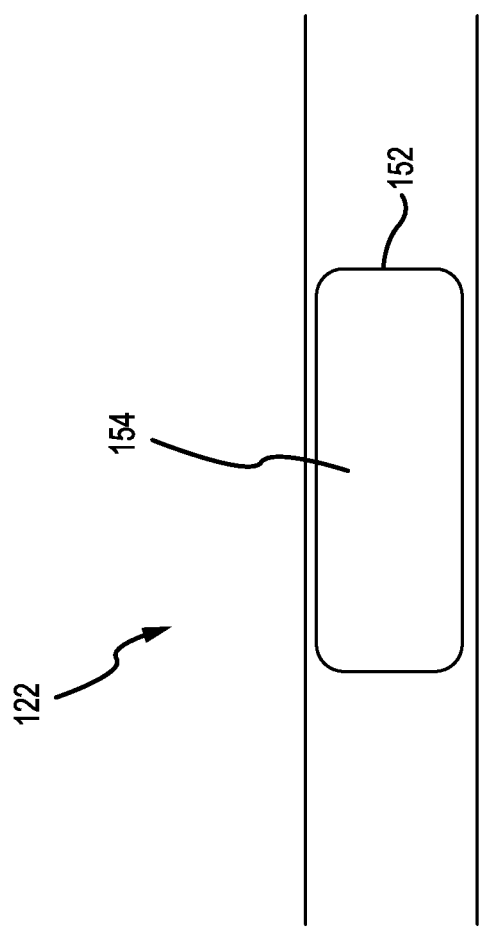

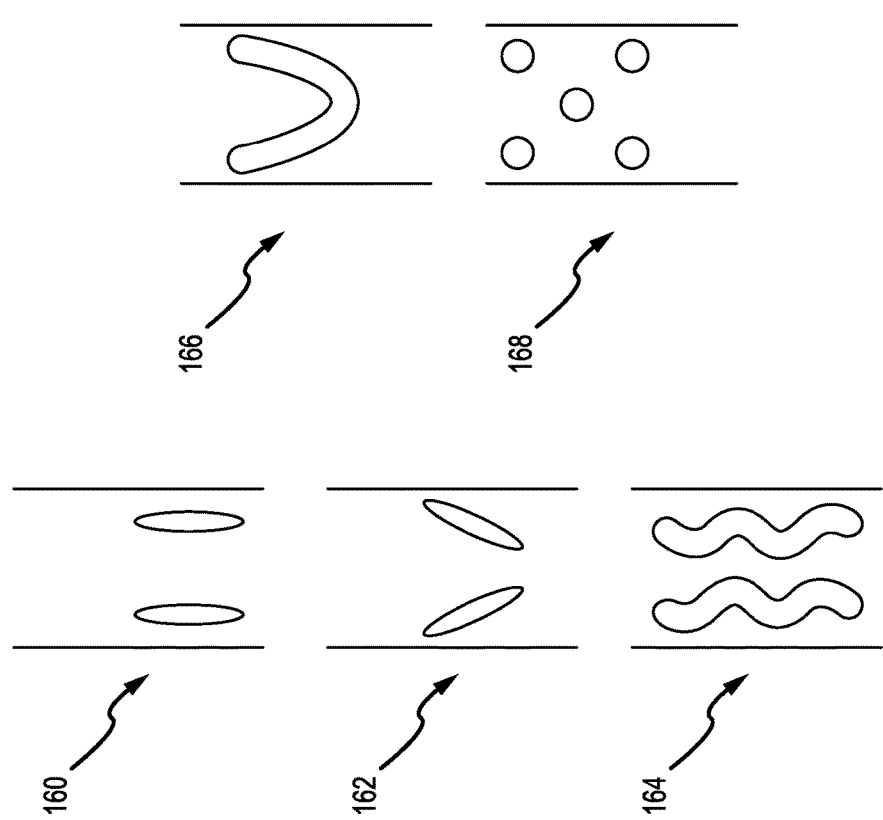

INTERNALLY COOLED ENGINE COMPONENTS

FIELD

The disclosure relates generally to gas turbine engines and, more specifically, to internally cooled components.

BACKGROUND

Turbine airfoils, outer air seals, and various other engine components operate in an environment where gas temperatures often exceed the thermal capacity of materials in the engine. These parts may utilize cooling features to protect against damage. Cooling air from the compressor can be routed to provide internal convection cooling within airfoils, for example. However, more cooling air bled from the compressor and used for cooling means less gas is available for work extraction. Thus, engine efficiency may be reduced if higher amounts of cooling air are consumed. As demands increase for higher thrust and/or efficiency, the turbine inlet temperatures are increased while the gas allocated for cooling is reduced.

Some components may implement air cooling systems with a series of internal cavities to cool a part. Skin cores, for example, are internal cooling passages near the external surfaces of a component. The internal passages of the skin cores may have cooling features throughout the passages to increase heat transfer. However, flat wall check locations lacking cooling features are also formed in the passages to allow for wall thickness checks. The flat wall check locations typically reduce cooling effectiveness.

SUMMARY

A component of a gas turbine engine is provided. The component may include an external surface with a skin cavity adjacent to the external surface. The skin cavity may be defined by a hot-side surface and a cool-side surface with the hot-side surface between the cool-side surface and the external surface. A flat portion may be disposed on the hot-side surface and may, for example, define a wall-thickness check region. A protrusion may be disposed on the cool-side surface opposite the flat portion on the hot-side surface.

In various embodiments, a first trip strip may be disposed on the hot-side surface with a second trip strip between the first trip strip and the flat portion. The first and second trip strips may have varying geometry. The protrusion on the cool-side surface may be disposed between flat portions of the cool-side surface. A first hydraulic diameter of the skin cavity taken at the first flat portion of the cool-side surface may be greater than a second hydraulic diameter of the skin cavity taken at the protrusion of the cool-side surface. For example, the second hydraulic diameter may be up to 40% less than the first hydraulic diameter. An internal cooling cavity may be internal to the component with the cool-side surface of the skin cavity located between the internal cooling cavity and the hot-side surface. The hot-side surface and the cool-side surface may accelerate a coolant flowing past the flat portion of the hot-side surface and the protrusion of the cool-side surface. The hot-side surface and the cool-side surface may also increase a heat transfer coefficient along the flat portion of the hot-side surface by at least 30%.

An airfoil is also provided. The airfoil may comprise a suction-side surface, an internal cooling cavity internal to the airfoil, and a skin cavity disposed between the suction-side surface and the internal cooling cavity. The skin cavity may be defined by a hot-side surface and a cool-side surface. A wall thickness check region may be located on the hot-side surface with a protrusion disposed on the cool-side surface opposite the wall thickness check region.

In various embodiments, a first trip strip may be disposed on the hot-side surface with a second trip strip between the first trip strip and the wall thickness check region. The protrusion on the cool-side surface may also be disposed between flat portions of the cool-side. A first hydraulic diameter of the skin cavity taken at the first flat portion of the cool-side surface may be greater than a second hydraulic diameter of the skin cavity taken at the wall thickness check region. For example, the second hydraulic diameter may be up to 40% less than the first hydraulic diameter. The hot-side surface and the cool-side surface may also be configured to accelerate a coolant flowing past the wall thickness check region.

A gas turbine engine is also provided. The gas turbine engine may include a compressor configured to rotate about an axis and compress a gas, a combustor aft of the compressor and configured to co bust the gas, and a turbine section aft of the combustor and configured to extract energy from the combusted gas. The turbine section may further include an airfoil configured to rotate about the axis. The airfoil may have a suction-side surface, an internal cooling cavity, a pressure-side surface with the internal cooling cavity between the pressure-side surface and the suction-side surface, and a first skin cavity disposed between the suction-side surface and the internal cooling cavity. A second skin cavity may also be disposed between the pressure-side surface and the internal cooling cavity. The first skin cavity may be defined by a hot-side surface and a cool-side surface. The hot-side surface may be disposed between the cool-side surface and the suction-side surface. A wall thickness check region may be located along the hot-side surface, with a protrusion disposed on the cool-side surface opposite the wall thickness check region.

In various embodiments, the airfoil may also include a first trip strip disposed on the hot-side surface and a second trip strip disposed between the first trip strip and the wall thickness check region. The protrusion on the cool-side surface may be disposed between flat portions of the cool-side surface. The hydraulic diameter of the skin cavity may be greater along the flat portion of the cool-side surface than along the protrusion of the cool-side surface. The hot-side surface and the cool-side surface may accelerate a coolant flowing past the wall thickness check region.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 3B illustrates a top view of a hot-side surface having cooling features, in accordance with various embodiments;

FIG. 3C illustrates a top view of a cool-side surface having a protruding feature, in accordance with various embodiments;

FIG. 4A illustrates a top view of various cooling features formable on a hot-side surface of a skin cavity, in accordance with various embodiments;

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Internally cooled engine components of the present disclosure include internal cooling passages having a combination of internal features. A wall check region may be defined in the internal cooling passages. A wall check region may be a smooth and continuous region on a wall of an internal cooling passage to facilitate a thickness check on the wall during manufacturing. The internal cooling passages have a trip strip upstream of the wall check region on the hot side wall and a feature on the cold side wall opposite the wall check region. This combination of cooling features increases the local heat transfer in the wall check region. The combination of cooling features increases the heat transfer coefficient by locally increasing the velocity in the wall check regions through a squeezing effect of the trip strip on the cold side wall. The cooling passages described herein thus promote better flow attachment on the hot side wall. The upstream trip strip on the hot side wall directs the flow to increase local heat transfer in the wall check region. The local velocity increase alone may result in an average heat transfer coefficient increase of up to 20%, 30%, or 40% in the wall check region.

Figure 1:
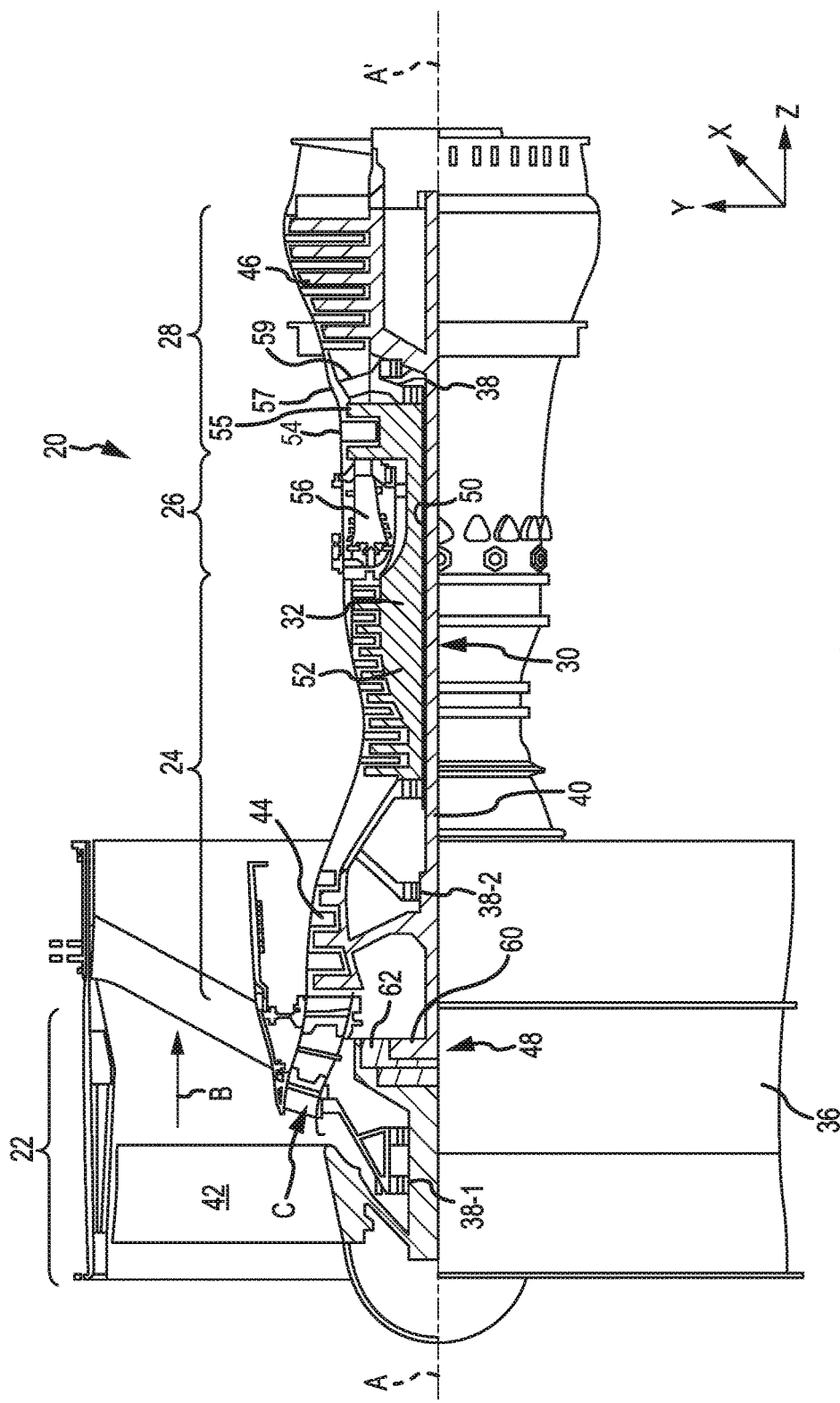
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augment section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low-pressure compressor 44 and a low-pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high-pressure compressor 52 and high-pressure turbine 54. Airfoils 55 of high-pressure turbine may rotate about the engine central longitudinal axis A-A'.

A combustor 56 may be located between high-pressure compressor 52 and high-pressure turbine 54. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high-pressure" compressor or turbine experiences a higher pressure than a corresponding "low-pressure" compressor or turbine.

The core airflow C may be compressed by low-pressure compressor 44 then high-pressure compressor 52, mixed and burned with fuel in combustor 56, then expanded over high-pressure turbine 54 and low-pressure turbine 46. Mid-turbine frame 57 includes airfoils 59, which are in the core airflow path. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low-pressure turbine 46 may have a pressure ratio that is greater than about five (5). In various embodiments, the diameter of fan 42 may be significantly larger than that of the low-pressure compressor 44. Low-pressure turbine 46 pressure ratio may be measured prior to inlet of low-pressure turbine 46 as related to the pressure at the outlet of low-pressure turbine 46 prior to an exhaust nozzle. It should be understood, however, that the above parameters are exemplary of various embodiments of a suitable geared architecture engine and that the present disclosure contemplates other turbine engines including direct drive turbofans.

Airfoil 55 may be an internally cooled component of gas turbine engine 20. Trip strips may be located in internal cooling cavities of internally cooled engine parts, as detailed further below, with flat portions also integrated into the internal cooling cavities for testing wall thickness. As used herein, the term flat as applied to cavity surfaces means smooth and continuous. Internally cooled engine parts may be discussed in the present disclosure in terms of airfoils. However, the present disclosure applies to any internally cooled engine component (e.g., blade outer air seals, airfoil platforms, combustor liners, blades, vanes, or any other internally cooled component in a gas turbine engine).

Figure 2B:
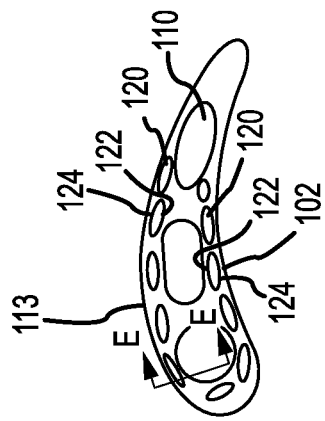
FIG. 2B illustrates a cross-sectional view of an airfoil having internal cavities, in accordance with various embodiments.
Figure 2A:
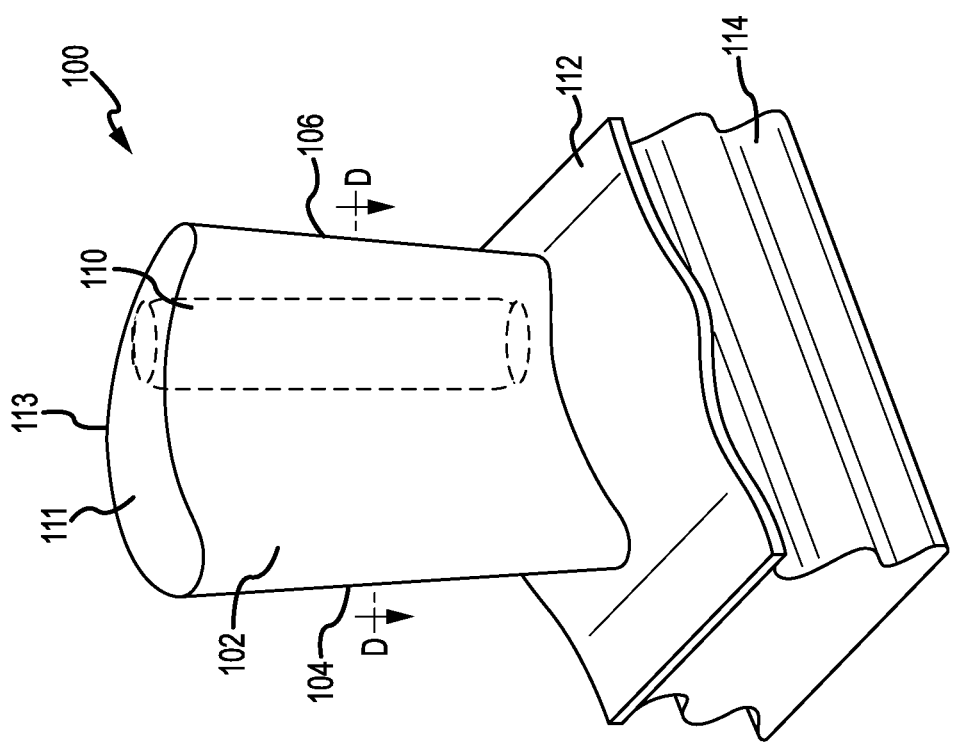
FIG. 2A illustrates a perspective view of an airfoil having internal cavities, in accordance with various embodiments.

With reference to FIG. 2A, an airfoil 100 is shown having an internal cooling passage 110, in accordance with various embodiments. Airfoil 100 has a pressure side 102, a leading edge 104, and a trailing edge 106. Airfoil 100 also includes tip 111 and suction side 113. Pressure side 102 surface includes ghosted line to illustrate an internal cooling passage 110. Internal cooling passage 110 is oriented generally in a direction from platform 112 and attachment 114 towards tip 111 (i.e., a radial direction when airfoil 100 is installed in a turbine).

Airfoil 100 may contain multiple cooling passages or chambers similar to internal cooling passage 110, as further illustrated in FIG. 2B, with the internal cooling passages being interconnected. Multiple geometries, sizes, and orientations of trip strips may appear in the internal cooling passages, as illustrated in further detail below. Hot air flowing through a gas turbine engine may first contact leading edge 104, flow along pressure side 102 and/or suction side 113, and leave airfoil at trailing edge 106.

With further reference to FIG. 2B, a cross-sectional view of airfoil 100 along line D-D is shown, in accordance with various embodiments. Internal cooling passages 110 may be formed central to airfoil 100. Additional cooling passages, referred to herein as skin cavities, may be formed adjacent external surfaces exposed to hot gas in the flow path. In the case of airfoil 100. Skin cavities 120 may be formed adjacent the pressure side 102 and/or suction side 113 of airfoil 100. Skin cavities 120 may be defined by a cool-side surface 122 and a hot-side surface 124 formed internally to airfoil 100. The terms hot-side and cold-side are used herein to describe opposite walls of cooling cavities (e.g., skin cavity 120) with the hot-side surface being closer to an external wall than the cold-side surface. Cool-side surface 122 may also be described as nearer to the center of airfoil 100 than hot-side surface 124 in cooling cavities. Hot-side surface 124 and cool-side surface 122 may include trip strips, protrusions, and recesses located on the surfaces to improve cooling performance.

Figure 3A:
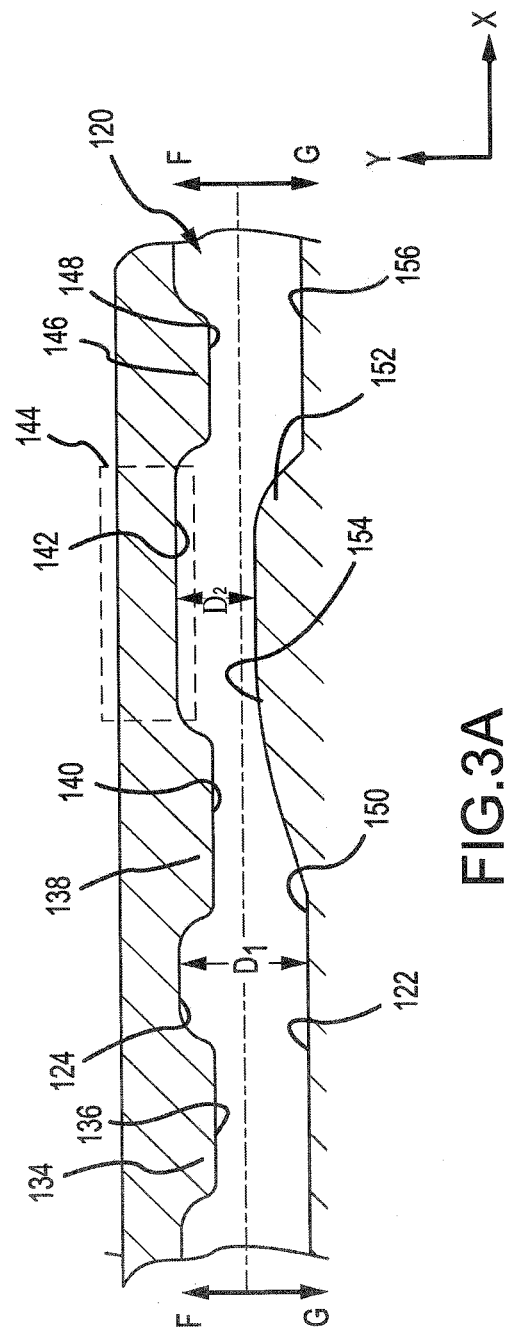
FIG. 3A illustrates a cross-sectional view of a skin cavity defined by a hot-side surface and a cool-side surface having varying geometry, in accordance with various embodiments.

Referring now to FIG. 3A, a cross-sectional view of airfoil 100 of FIG. 2B through skin cavity 120 along line E-E is shown, according to various embodiments. Skin cavity 120 is defined by hot-side surface 124 and cool-side surface 122 oriented towards one another. Hot-side surface 124 may include trip strip 134 having surface 136 exposed in skin cavity 120. Another trip strip 138 having surface 140 exposed in skin cavity 120 may be disposed between trip strip 134 and flat surface 142. Flat surface 142 may span wall thickness check region 144. Flat surface 142 may be followed by another trip strip 146 having surface 148 exposed in skin cavity 120.

With reference to FIGS. 3A and 3B, hot-side surface 124 may include varied trip strip geometry according to various embodiments. Trip strip 134, which is disposed opposite substantially flat surface 150 on cool-side surface 122, may have a similar geometry to other trip strips in skin cavity that are disposed opposite flat surfaces. Trip strip 138, which is upstream from wall thickness check region 144 and opposite protrusion 152, may have a different geometry from trip strip 134. The geometry of trip strip 138 may be selected to increase cooling on hot-side surface in the wall thickness check region 144 following trip strip 138. Trip strip 146, which is opposite substantially flat surface 156 and downstream from wall thickness check region 144, may have a geometry similar to trip strip 134.

With reference to FIGS. 3A, 3B, and 3C, coolant may flow in the x direction through skin cavity 120 and flow past trip strip 134, then past trip strip 138, then past flat surface 142, then past trip strip 146. Cool-side surface 122 may have geometry complimentary to that of hot-side surface 124 to improve cooling characteristics along flat surface 142. Cool-side surface may include a protrusion 152 having a surface 154 exposed to skin cavity 120. Protrusion 152 may include on either side substantially flat surface 150 or substantially flat surface 156 extending in the x direction.

In various embodiments, protrusion 152 may be oriented across skin cavity 120 in the y direction from flat surface 142. Protrusion 152 may also be oriented across skin cavity 120 in the y direction from trip strip 138. In that regard, the cool-side surface 122 and hot-side surface 124 may act in concert to accelerate coolant in the x direction by reducing the hydraulic diameter of skin cavity 120. Thus, hydraulic diameter $D_1$ between substantially flat surface 150 and hot-side surface 124 may be greater than the hydraulic diameter $D_2$ between protrusion 152 and flat surface 142. For example, the hydraulic diameter $D_2$ of skin cavity 120 may be up to 50%, 40%, 30%, 20%, or 10% less than the hydraulic diameter $D_1$ of skin cavity 120.

Referring now to FIG. 4A, exemplary trip strip geometries are shown for hot-side surface 124 of FIG. 3B according to various embodiments. The trip strips of FIG. 4 may be positioned on hot-side surface 124 in place of any of the trip strips illustrated in FIG. 3B, for example. Elongated trip strip 160 may protrude from hot-side surface 124. Elongated trip strip 160 may be parallel to one another and have similar dimensions. Elongated trip strip 162 may also protrude from hot-side surface 124. Elongated trip strip 162 may be angled relative to one another such that the trip strips are non-parallel. Elongated trip strip 162 may also have similar dimensions.

In various embodiments, s-shaped trip strips 164 may protrude from hot-side surface 124. S-shaped trip strips 164 may have an undulating geometry similar to a sine wave, for example. S-shaped trip strips 164 may be formed in pairs having similar geometry and dimensions. S-shaped trip strips 164 may also be oriented individually. Chevron trip strip 166 may also protrude from hot-side surface 124. Chevron trip strips 166 may have a v shape and may be oriented with the point of the v shape directed generally upstream or downstream. Pedestal trip strips 168 may protrude from hot-side surface 124. Pedestal trip strips may be formed having varied or similar geometries and dimensions. Pedestal trip strips may also have varying pitch density.

Figure 4C:
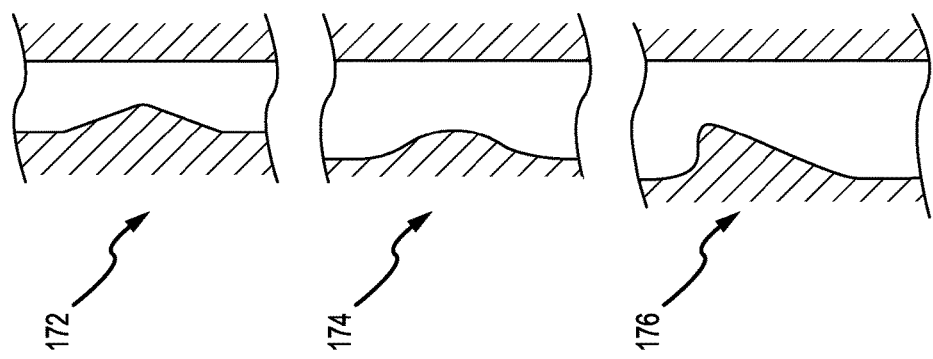
FIG. 4C illustrates a cross-sectional view of various protrusion geometries formable on a cool-side surface of a skin cavity, in accordance with various embodiments.
Figure 4B:
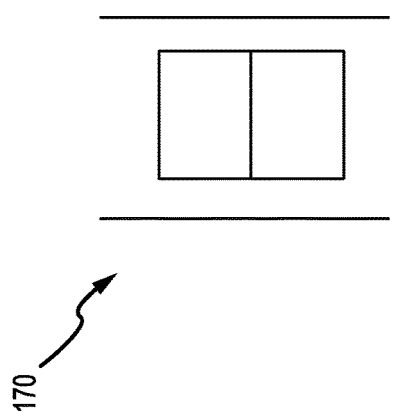
FIG. 4B illustrates a top view of a protrusion formable on a cool-side surface of a skin cavity, in accordance with various embodiments.

With reference to FIG. 4B, a top view of protrusion 170 is shown for cool-side surface 122 of FIG. 3C. Protrusion 170 may be similar to protrusion 152 of FIG. 3C, and may be positioned in place of protrusion 152 on cool-side surface 122. Protrusion 170 is illustrated as having geometry similar to an isosceles triangle. Referring to FIGS. 4B and 4C, protrusion 172 is shown as a cross-sectional view of protrusion 170. Other profiles of protrusion 170 may also be used on cool-side surface 122 opposite a wall thickness check location. For example, a rounded protrusion 174 may be positioned on cool-side surface 122 opposite a wall thickness check location. Similarly, triangular protrusion 176 having an angle of 80-90° opposite its hypotenuse may be positioned on cool-side surface 122 opposite a wall thickness check location.

In various embodiments, the skin cavities 120, hot-side surfaces 124, and cool-side surfaces 122 of FIGS. 3A through 3C may be made using an additive manufacturing technique such as direct metal laser sintering, selective laser sintering, selective laser melting, electron-beam melting, or electron-beam freeform fabrication. Casting may also be used to form skin cavities 120 in an internally cooled component. To cast an airfoil 100 of FIG. 2A or another internally cooled component with a skin cavity 120, a core may be formed. The core of the component wall may have a negative of the skin cavity 120 and its various cooling features. In that regard, trip strips and protrusions of skin cavity 120 may be formed on the core as indentations, while recesses of skin cavity 120 may be formed on the core as protrusions. The core may then be placed in a mold, and the material to form the internally cooled component may be deposited in the mold. The core layer may be removed from the internally cooled component, leaving a cavity with the desired trip strip shapes. Airfoil 100 (as well as other internally cooled components) may be made from an austenitic nickel-chromium-based alloy such as that sold under the trademark Inconel® is available from Special Metals Corporation of New Hartford, N.Y., USA, or other materials capable of withstanding exhaust temperatures.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein, in the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A component of a gas turbine engine, comprising:
   an external surface;
   a skin cavity adjacent the external surface and internal to the component, wherein the skin cavity is defined by a hot-side surface and a cool-side surface, wherein the hot-side surface is between the cool-side surface and the external surface;
   a first trip strip disposed on the hot-side surface and having a first geometry;
   a second trip strip disposed on the hot-side surface adjacent the first trip strip, wherein the second trip strip has a second geometry different from the first geometry;
   a third trip strip disposed on the hot-side surface;
   a flat portion on the hot-side surface, the flat portion being smooth and continuous and extending from the second trip strip to the third trip strip; and
   a protrusion disposed on the cool-side surface opposite the flat portion on the hot-side surface.

2. The component of the gas turbine engine of claim 1, wherein the protrusion on the cool-side surface is disposed between a first flat portion of the cool-side surface and a second flat portion of the cool-side surface.

3. The component of the gas turbine engine of claim 2, wherein a first hydraulic diameter of the skin cavity taken at the first flat portion of the cool-side surface is greater than a second hydraulic diameter of the skin cavity taken at the protrusion of the cool-side surface.

4. The component of the gas turbine engine of claim 3, wherein the second hydraulic diameter is up to 40% less than the first hydraulic diameter.

5. The component of the gas turbine engine of claim 1, further comprising an internal cooling cavity internal to the component, wherein the cool-side surface of the skin cavity is between the internal cooling cavity and the hot-side surface of the skin cavity.

6. The component of the gas turbine engine of claim 1, wherein the hot-side surface and the cool-side surface are configured to accelerate a coolant flowing past the flat portion of the hot-side surface and the protrusion of the cool-side surface.

7. The component of the gas turbine engine of claim 1, wherein the hot-side surface and the cool-side surface are configured to increase a heat transfer coefficient along the flat portion of the hot-side surface by at least 30% relative to a second local heat transfer coefficient along the first trip strip.

8. The component of the gas turbine engine of claim 1, wherein the third trip strip has the first geometry of the first trip strip.

9. An airfoil, comprising:
   an external surface;
   an internal cooling cavity internal to the airfoil;
   a skin cavity disposed between the external surface and the internal cooling cavity, wherein the skin cavity is defined by a hot-side surface and a cool-side surface, wherein the hot-side surface is between the cool-side surface and the external surface;
   a first trip strip disposed on the hot-side surface and having a first geometry;
   a second trip strip disposed on the hot-side surface adjacent to the first trip strip, wherein the second trip strip has a second geometry different from the first geometry;
   a third trip strip disposed on the hot-side surface;
   a wall thickness check region on the hot-side surface, the wall thickness check region being smooth and continuous and extending from the second trip strip to the third trip strip; and
   a protrusion disposed on the cool-side surface opposite the wall thickness check region.

10. The airfoil of claim 9, wherein the protrusion on the cool-side surface is disposed between a first flat portion of the cool-side surface and a second flat portion of the cool-side surface.

11. The airfoil of claim 10, wherein a first hydraulic diameter of the skin cavity taken at the first flat portion of the cool-side surface is greater than a second hydraulic diameter of the skin cavity taken at the wall thickness check region.

12. The airfoil of claim 11, wherein the second hydraulic diameter is up to 40% less than the first hydraulic diameter.

13. The airfoil of claim 9, wherein the hot-side surface and the cool-side surface are configured to accelerate a coolant flowing past the wall thickness check region.

14. The airfoil of claim 9, wherein the third trip strip has the first geometry of the first trip strip.

15. A gas turbine engine, comprising:
    a compressor configured to rotate about an axis and compress a gas;
    a combustor aft of the compressor and configured to combust the gas;
    a turbine section aft of the combustor and configured to extract energy from the combusted gas, wherein the turbine section comprises an airfoil configured to rotate about the axis, the airfoil comprising:
    a first external surface;
    an internal cooling cavity internal to the airfoil;
    a second external surface opposite the internal cooling cavity from the first external surface;
    a first skin cavity disposed between the first external surface and the internal cooling cavity, wherein the first skin cavity is defined by a hot-side surface and a cool-side surface, wherein the hot-side surface is between the cool-side surface and the first external surface;
    a first trip strip disposed on the hot-side surface and having a first geometry;
    a second trip strip disposed on the hot-side surface adjacent to the first trip strip, wherein the second trip strip has a second geometry different from the first geometry;
    a third trip strip disposed on the hot-side surface;
    a wall thickness check region on the hot-side surface, the wall thickness check region being smooth and continuous and extending from the second trip strip to the third trip strip;
    a protrusion disposed on the cool-side surface opposite the wall thickness check region; and
    a second skin cavity disposed between the second external surface and the internal cooling cavity.

16. The gas turbine engine of claim 15, wherein the protrusion on the cool-side surface is disposed between a first flat portion of the cool-side surface and a second flat portion of the cool-side surface.

17. The gas turbine engine of claim 16, wherein a first hydraulic diameter of the first skin cavity taken at the first flat portion of the cool-side surface is greater than a second hydraulic diameter of the first skin cavity taken at the wall thickness check region.

18. The gas turbine engine of claim 17, wherein the second hydraulic diameter is up to 40% less than the first hydraulic diameter.

19. The gas turbine engine of claim 15, wherein the hot-side surface and the cool-side surface are configured to accelerate a coolant flowing past the wall thickness check region.

20. The gas turbine engine of claim 15, wherein the third trip strip has the first geometry of the first trip strip.

* * * * *